United States Patent [19]
Abe et al.

[11] Patent Number: 4,706,111
[45] Date of Patent: Nov. 10, 1987

[54] METHOD OF ERROR MODIFICATION FOR VIDEO DATA

[75] Inventors: Takao Abe; Tetsuo Ogaga, both of Kanagawa, Japan

[73] Assignee: Sony Corporation, Tokyo, Japan

[21] Appl. No.: 853,138

[22] Filed: Apr. 17, 1986

[30] Foreign Application Priority Data

Apr. 19, 1985 [JP] Japan ................................ 60-084103

[51] Int. Cl.$^4$ ............................................. H04N 9/88
[52] U.S. Cl. .................................... 358/21 R; 358/36; 358/314
[58] Field of Search .................. 358/36, 314, 21 R, 15

[56] References Cited

U.S. PATENT DOCUMENTS

| | | | |
|---|---|---|---|
| 4,464,674 | 8/1984 | Schulz et al. | 358/21 R |
| 4,498,104 | 2/1985 | Schulz | 358/314 |
| 4,584,597 | 4/1986 | Guichard | 358/13 |

Primary Examiner—John W. Shepperd
Attorney, Agent, or Firm—Lewis H. Eslinger; Alvin Sinderbrand

[57] ABSTRACT

In effecting error modification of component video data having predetermined relationships, for example in the playback side of a digital VTR for the Y, $C_R$, and $C_B$ component system, a range of values that is allowable for the data indicated to be erroneous by its error flag, is defined on the basis of the data indicated to be correct by its error flag, and, when the erroneous data is outside the allowable range, such erroneous data is modified to have a value within the allowable range, for example, near the center thereof, and is then output. By this arrangement, when the Y, $C_R$, and $C_B$ signals are converted into playback R, G, and B signals, the latter do not exceed the ranges of values thereof necessary for proper color balance of the reproduced picture.

10 Claims, 11 Drawing Figures

METHOD OF ERROR MODIFICATION FOR VIDEO DATA

BACKGROUND OF THE INVENTION

1. Field of the Invention

The present invention relates to a method of error modification for video data of the Y, $C_R$, and $C_B$ component system consisting of a luminance signal and two color different signals, and more particularly is directed to a method of modifying residual error data that have been uncorrectable in an error correction process.

2. Description of the Prior Art

For component digital coding of a video signal in digital TV studios, there has been proposed a method which uses the sampling frequency of 13.5 MHz for the luminance signal Y and the sampling frequency of 6.75 MHz for each of the color difference signals $C_R$ ($=R-Y$) and $C_B$ ($=B-Y$), i.e., the so-called 4:2:2 component coding system.

Figure 4:
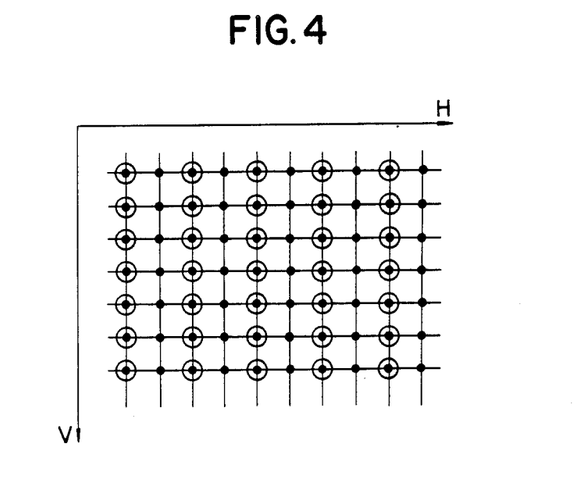
FIGS. 4 and 5 are schematic diagrams used for explanation of the prior art.
Figure 5:
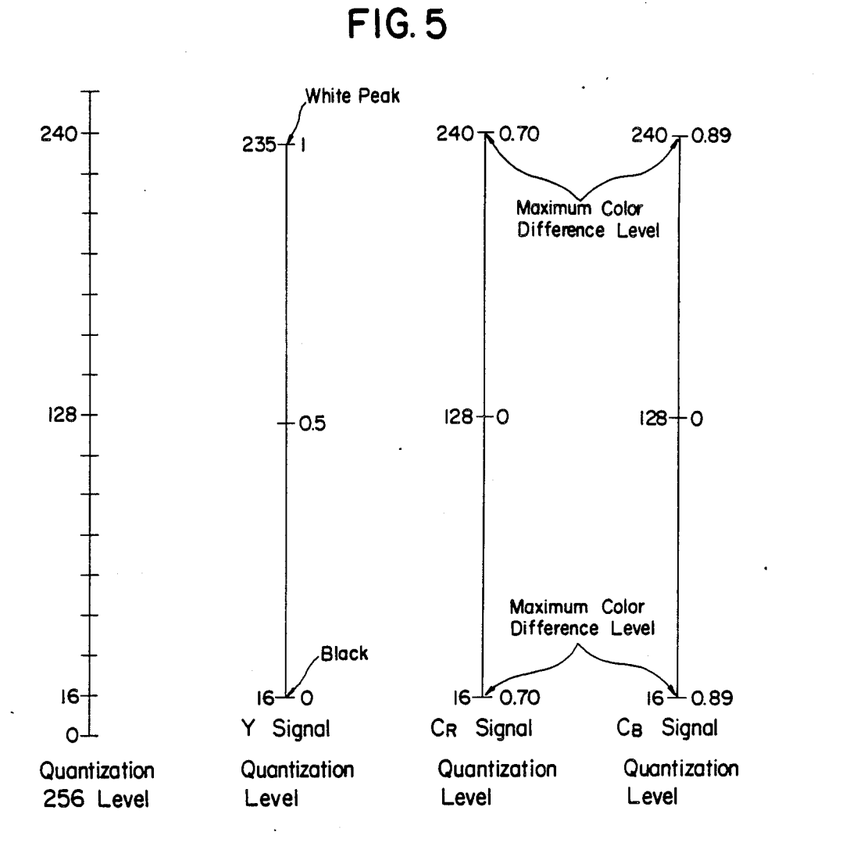

The sampling structure of this system is understood to be in spatially static, perpendicularly crossing lattice form (orthogonal) as shown in FIG. 4 and in which sampling positions of the Y signal represented by black dots and those of the $C_R$ and $C_B$ signals represented by white dots are shown to be in common, or coincide. Quantization is carried out in accordance with the 8-bit linear quantization system (256 levels), and the quantization levels for the peak levels corresponding to each of the Y, $C_R$ and $C_B$ signals are specified as shown in FIG. 5. Thus, the black level for the Y signal is a quantization level of 16 and the white peak level thereof is a quantization level of 235, and the maximum color difference levels for each of the $C_R$ and $C_B$ signals are quantization levels of 16 and 240.

The Y, $C_R$ and $C_B$ signals are in the following relationship with the three primary color signals R, G, and B:

$$\left. \begin{array}{l} Y = 0.299R + 0.587G + 0.114B \\ C_R = R - Y \\ \phantom{C_R} = 0.701R - 0.587G - 0.114B \\ C_B = B - Y \\ \phantom{C_B} = -0.299R - 0.587G + 0.868B \end{array} \right\} \quad (1)$$

Conversely, the R, G, and B signals can be expressed in terms of the Y, $C_R$ and $C_B$ signals as shown in the following equations (2):

$$\left. \begin{array}{l} R = Y + C_R \\ G = Y - 0.509C_R - 0.194C_B \\ B = Y + C_B \end{array} \right\} \quad (2)$$

In the prior art digital VTRs of the 4:2:2 component system, the Y, $C_R$ and $C_B$ signals are recorded and reproduced so as to satisfy the above mentioned conditions.

Figure 6:
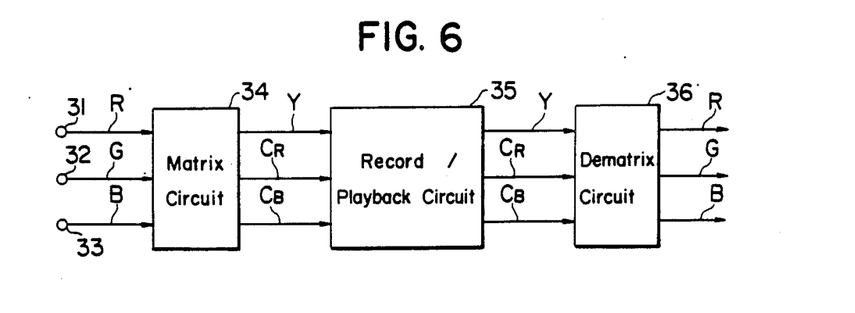
FIG. 6 is a block diagram used for explanation of a digital VTR according to the prior art.

More particularly, as shown on FIG. 6, in a known digital VTR, an R signal converted into 8-bit digital data, for example, is supplied from an input 31 to a matrix circuit 34, a G signal converted into 8-bit digital data, for example, is supplied from an input 32 to the matrix circuit 34, and a B signal converted into 8-bit digital data, for example, is supplied from an input 33 to the matrix circuit 34.

In the matrix circuit 34, the R, G, and B signals are matrixed in accordance with the above equations (1) into Y, $C_R$, and $C_B$ signals and these signals are supplied or input to a record/playback circuit 35.

In the recording side of the record/playback circuit 35, the data are encoded with error correcting codes and then recorded on a recording medium as the Y, $C_R$, and $C_B$ component signal data. In the playback side of the record/playback circuit 35, the data recorded on the recording medium are reproduced, the reproduced Y, $C_R$, and $C_B$ signals are subjected to an error correction process, the data which are uncorrectable in the error correction process are subjected to an error concealment process, and the thus provided output is supplied to a dematrix circuit 36.

In the dematrix circuit 36, the reproduced Y, $C_R$, and $C_B$ signals are matrixed in accordance with the above mentioned equations (2) and the reproduced R, G, B signals are generated and output from circuit 36.

Figure 7A:
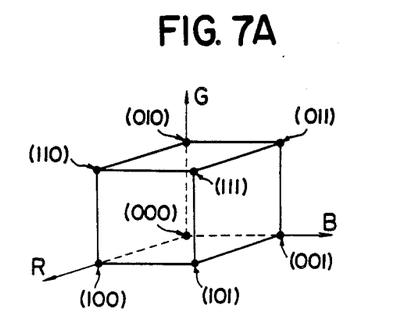
FIGS. 7A and 7B are schematic diagrams used for explanation of the prior art and FIGS. 8A, 8B, and 8C are schematic diagrams also used for explanation of the prior art.
Figure 7B:
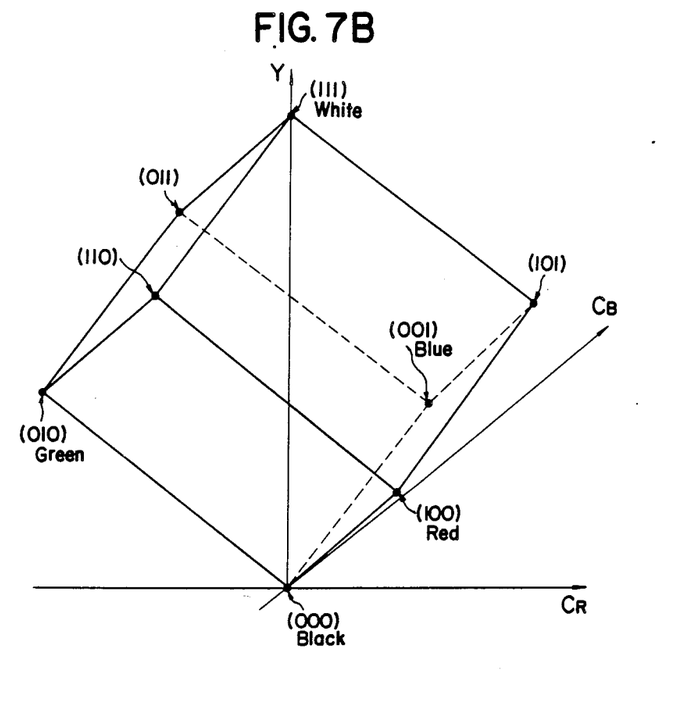

FIGS. 7A and 7B indicate the relationship between the signals that are converted through the R, G, and B signals→Y, $C_R$, and $C_B$ signals conversion and the signals resulting from the reproduced Y, $C_R$, and $C_B$ signals→playback R, G, and B signals conversion performed in the matrix circuit 34 and the dematrix circuit 36, respectively.

FIG. 7A expresses the R, G, and B signals in a cubic manner assuming that the amplitude of each signal is a value between 0 and 1 and that the R signal is shown in the z axis, the G signal in the y axis, and the B signal in the x axis.

Figure 8A:
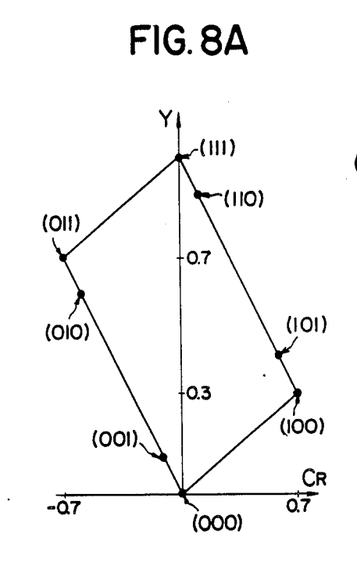
Figure 8B:
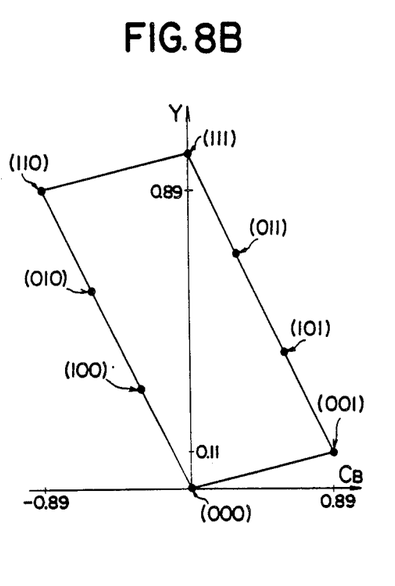
Figure 8C:
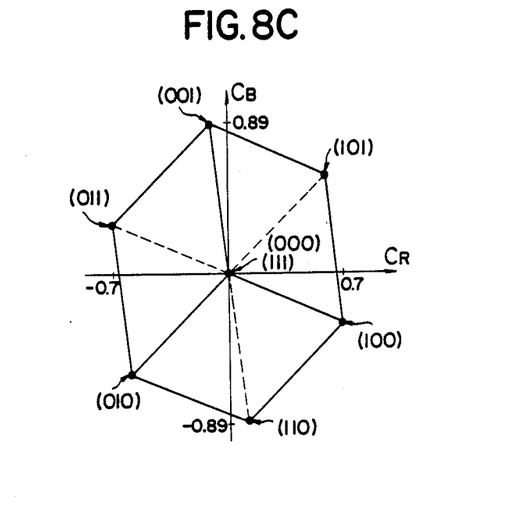

The cube in FIG. 7A is transformed into the cube indicated in FIG. 7B through mapping of one-to-one correspondance performed in the matrix circuit 34 in accordance with the equations (1) defining the transformation. In FIG. 7B, the Y signal is represented by the y axis, the $C_B$ signal is represented by the z axis, and the $C_R$ signal is represented by the x axis. The transformation is as follows:

$(R, G, B) =$ $(0, 0, 0) \rightarrow (0 \quad\quad 0 \quad\quad 0)$ $(1, 0, 0) \rightarrow (0.299 \quad 0.701 \; -0.299)$ $(0, 1, 0) \rightarrow (0.587 \; -0.587 \; -0.587)$ $(0, 0, 1) \rightarrow (0.114 \; -0.114 \quad 0.886)$ $(1, 1, 0) \rightarrow (0.886 \quad 0.114 \; -0.886)$ $(1, 0, 1) \rightarrow (0.413 \quad 0.587 \quad 0.587)$ $(0, 1, 1) \rightarrow (0.701 \; -0.701 \quad 0.299)$ $(1, 1, 1) \rightarrow (1 \quad\quad 0 \quad\quad 0)$ $= (Y, C_R, C_B)$ FIG. 8A is a projection drawing of the cube in FIG. 7B as viewed on the $(Y-C_R)$ plane, FIG. 8B is a projection of the cube in FIG. 7B as viewed on the $(Y-C_B)$ plane, and FIG. 8C is a projection of the cube in FIG. 7B as viewed on the $(C_R-C_B)$ plane.

As is apparent from FIGS. 8A, 8B, and 8C, when the amplitudes of the R, G, and B signals are assumed to be values between 0 and 1, the domains of the values of the corresponding signals Y, $C_R$, and $C_B$ are given by the following equations (3):

$$\left.\begin{array}{c} 0 \leq Y \leq 1 \\ -0.701 \leq C_R \leq 0.701 \\ -0.886 \leq C_B \leq 0.886 \end{array}\right\} \quad (3)$$

Further, the cube indicated in FIG. 7B is transformed again into the cube indicated in FIG. 7A through mapping of one-to-one correspondence performed in the dematrix circuit 34 in accordance with the equations (2) defining the transformation.

In the digital VTRs employing the 4:2:2 component system as described above, the input R, G, and B signal data having amplitude values between 0 and 1 independently of each other are converted by matrixing into the corresponding Y, $C_R$, and $C_B$ signals, which are then provided with error correcting codes and recorded. In the playback side, error correction is effected for the signals and if there are some uncorrectable residual errors, these are compensated for by error concealment.

When considering the range (domain) of values that the Y, $C_R$, and $C_B$ signals can take, it is to be noted that these values cannot be of arbitrary magnitude and independent of one another but are related to each other and subject to some restriction predetermined by their relationship with the R, G, and B signals. However, in the prior art digital VTRs, the Y, $C_R$, and $C_B$ signals were treated as independent variables having the domains indicated in the above mentioned equations (3). Thus, for example, if the Y signal obtained from the reproduced Y, $C_R$, and $C_B$ signals was correct and Y=1, then $C_R=0$ and $C_b=0$ should be obtained as a necessary consequence. However sometimes happens that such erroneous data as $C_R=0.5$ and $C_B=0.5$ is obtained when some error to occurs in the course of the record—playback process. If such Y, $C_R$, and $C_B$ signals were converted by the dematrix circuit 36 of the prior art digital VTR into R, G, and B signals, their values would become R=1.5, G=0.64, and B=1.5. Thus, reproduced R, G, and B signals that could not fundamentally exist were output from circuit 36, and as a result, an abnormally bright red or blue color, for example, was produced and the quality of the picture was thereby greatly deteriorated. Even if the amplitudes of the R, G, and B signals were forcibly limited to within the range between 0 and 1, it was not possible to modify the error data so as to provide them with correct values. Moreover, once the conversion into the R, G, and B signals was made, it was difficult to modify the signals so as to restore them to their correct values since the error information for the data had already been lost.

SUMMARY OF THE INVENTION

Accordingly, a primary object of the invention is to provide a method for modifying residual erroneous component video data so that a disallowed combination of the Y, $C_R$ and $C_B$ signal data will be modified to bring the data within a specific allowed region and thereby improve the quality of the reproduced picture.

To achieve the above mentioned object, the present invention provides an error modification circuit which is adapted to receive the Y, $C_R$, and $C_B$ component video signal data that are sampled in positions in close vicinity to each other and error flags provided for each of the component video signal data, and detects whether or not data that is indicated to be erroneous by the respective error flag is present in the specific region that is defined based on the data judged to be correct by the respective error flag. Then, the error modification circuit modifies the data judged to be erroneous by the error flag and which is detected to be outside the specific region, so that sure data may be brought back into the speciic region.

More particularly, in the error modification circuit according to the present invention, a ROM is supplied with the data for the Y, $C_R$, and $C_B$ signals together with error flags $F_Y$, $F_R$, and $F_B$ for these data. In The ROM the range (domain) of the values that are allowed for the residual error data judged to be erroneous by the respective error flag and unable to be corrected is defined on the basis of the data judged to be correct by the error flag, whether or not the error data is present within sure range is detected, and, when the error data is outside the range, the error data is modified so that the same assumes a value in the vicinity of the central value of the values that are allowed for the data in question. The thus obtained Y, $C_R$, and $C_B$ signals are supplied to the dematrix circuit and converted by matrixing into R, G, and B output signals which never exceed the domain of allowed values therefor from 0 to 1.

DESCRIPTION OF THE PREFERRED EMBODIMENT

1. Overall Structure

Figure 1:
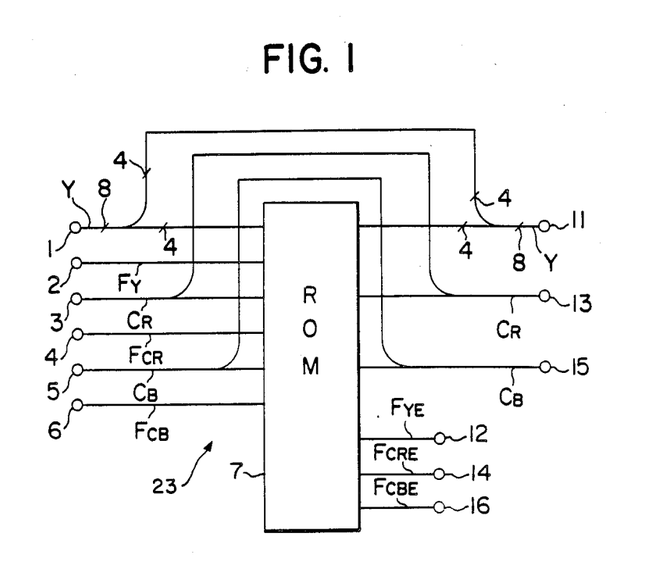
FIG. 1 is a block diagram showing an error modification circuit according to an embodiment of the present invention.

A preferred embodiment of the invention will now be described below with reference FIGS. 1 and 2. FIG. 1 shows the structure of an error modification circuit 23 according to an embodiment of the invention and which is connected to the output side of an error concealment circuit 22 in the playback side of a digital VTR as indicated in FIG. 2.

Figure 2:
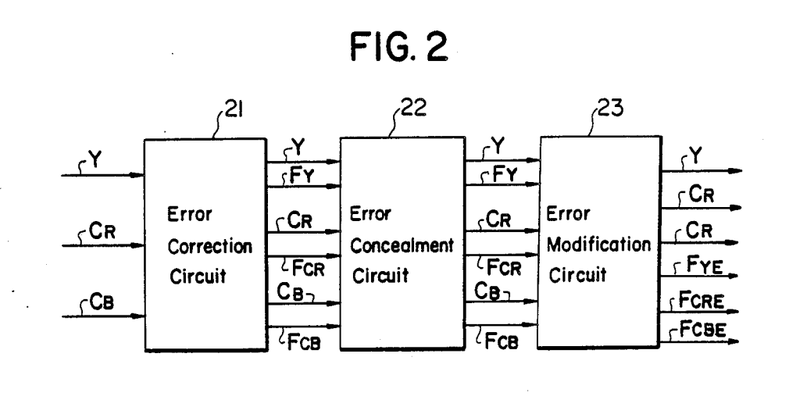
FIG. 2 is a block diagram showing components included in the reproducing or playback side of a digital VTR having an error modification circuit according to an embodiment of the invention.

Reproduced component signals Y, $C_R$, and $C_B$ read out from a recording medium are supplied to an error correction circuit denoted by 21 in FIG. 2. In the error correction circuit 21, error correction is performed for each of the Y, $C_R$, and $C_B$ signal data and, if some error data is then uncorrectable, error flags are set for the error data and the reproduced signals and the error flags $F_Y$, $F_{CR}$, and $F_{CB}$ together are supplied to the error concealment circuit 22.

According to the error flags, the residual error data left uncorrected by the correction process in the error correction circuit 21 are subjected to an error concealment process by interpolation or the like in the error concealment circuit 22. Then, the data which has undergone the error concealment process together with the error flags $F_Y$, $F_{CR}$, and $F_{CB}$ are then supplied to the error modification circuit 23.

In the error modification circuit 23, the range of values that are allowed for the error data judged to be erroneous by the error flag is defined on the basis of the data judged to be correct by the error flag and it is detected whether or not the error data is within that allowed range of values. Namely, it is judged whether or not the R, G, and B signals and the Y, $C_R$, and $C_B$ signals are in the relationship to satisfy the predetermined conditions. If the error data is within the specific region or range of values defined on the basis of the data judged to be correct, the error data is output as it is, and if the error data is outside that specific region, the error data is modified so as to represent a value in the vicinity of the central value of that specific region and then output.

The outputs of the error modification circuit 23 are supplied to a dematrix circuit (not shown on FIG. 1 or 2) and converted by matrixing therein to be provide reproduced R, G and B signals as the outputs therefrom.

2. Concrete Example of the Error Modification Circuit

FIG. 1 shows a specific arrangement of the error modification circuit 23. In this arrangement, in order not to enlarge the circuit the error modification is performed using only the four high-order bits, as the representative values, of the reproduced component signals of eight-bit digital data.

For example, the Y signal data is supplied from the error concealment circuit 22 to an input terminal 1. An error flag $F_Y$ indicating whether or not the Y signal data is erroneous is supplied from the error concealment circuit 22 to an input terminal 2.

The $C_R$ signal data is supplied from the error concealment circuit 22 to an input terminal 3. An error flag $F_{CR}$ indicating whether or not the $C_R$ signal data is erroneous is supplied from the error concealment circuit 22 to an input terminal 4.

The $C_B$ signal data is supplied from the error concealment circuit 22 to an input terminal 5. An error flag $F_{CB}$ indicating whether or not the $C_B$ signal data is erroneous is supplied from the error concealment circuit 22 to an input terminal 6.

Four high-order bits of the eight-bit Y signal data supplied to the input 1 are applied to the ROM 7 and the four low-order bits are delivered directly to the output terminal 11. The error flag $F_Y$ supplied to the input terminal 2 is applied to the ROM 7.

Four high-order bits of the eight-bit $C_R$ signal data supplied to the input 3 are applied to the ROM 7 and the four low-order bits are delivered directly to the output terminal 13. The error flag $F_{CR}$ supplied to the input terminal 4 is applied to the ROM 7.

Four high-order bits of the eight-bit $C_B$ signal data supplied to the input 5 are applied to the ROM 7 and the four low-order bits are delivered directly to the output terminal 15. The error flag $F_{CB}$ supplied to the input terminal 6 is applied to the ROM 7.

In the ROM 7, data modification is applied to the error data that are judged to require the same, and, after such modification, if required, the 4-bit Y signal data passed through the ROM 7 is output to the output terminal 11, the four-bit $C_R$ signal data passed through the ROM 7 is output to the output terminal 13, and the four-bit $C_B$ signal data passed through the ROM 7 is output to the output terminal 15.

When modification has been applied to the Y signal data, a flag $F_{YE}$ indicating that fact is output to an output terminal 12. Similarly, when modification has been applied to the $C_R$ signal data, a flag $F_{CRE}$ indicating that fact is output to an output terminal 14, and when modification has been applied to the $C_B$ signal data, a flag $F_{CBE}$ indicating the fact is output to an output terminal 16. These flags $F_{YE}$, $F_{CRE}$ and $F_{CBE}$ are used in the succeeding stage when necessary. For example, in an arrangement in which the error modification ciruict indicated in FIG. 1 is provided a stage preceding the error concealment circuit 22, these flags $F_{YE}$, $F_{CRE}$, and $F_{CBE}$ are supplied to the error concealment circuit 22 in the succeeding stage.

3. Operations of the Error Modification Circuit

Operations of the ROM 7 will be described below with reference to the following Table 1 which indicates all the possible combinations of the error flags that are applied to the ROM 7. In Table 1, ○ indicates that the data corresponding to the error flag $F_Y$, $F_{CR}$ or $F_{CB}$ is correct and × indicates that the data corresponding to the error flag is erroneous.

TABLE 1

| Case | Combination of Error Flags | | |
|---|---|---|---|
| | $F_Y$ | $F_{CR}$ | $F_{CB}$ |
| a | ○ | ○ | ○ |
| b | ○ | ○ | × |
| c | ○ | × | ○ |
| d | × | ○ | ○ |
| e | ○ | × | × |
| f | × | ○ | × |
| g | × | × | ○ |
| h | × | × | × |

In case a of Table 1, all the data for the component signals Y, $C_R$, and $C_B$ are judged to be correct and these data are not modifed in the ROM 7 but rather are output as they are.

In case b of Table 1, the Y signal data and the $C_R$ signal data are judged to be correct and the $C_B$ signal data is judged to be erroneous. In this case, according to the relationship between the Y, $C_R$, and $C_B$ signals and the R, G, and B signals defined by the previously mentioned equations (2), the $C_B$ signal data must be within the range defined by $$0 \leq Y - 0.509 \cdot C_R - 0.194 \cdot C_B \leq 1$$
$$0 \leq B = Y - C_B \leq 1$$

and therefore, the range of the values of the $C_B$ signal data to be output is defined by $$(1/0.194)(Y-0.509 \cdot C_R-1.0) \leq C_B \leq (1/0.194)(Y-0.509 \cdot C_R)$$

$$Y - 1.0 \leq C_B \leq Y.$$

Next, it is judged whether or not the $C_B$ signal data is within the above range. If the $C_B$ signal data is within such range, the same is output as it is. If the $C_B$ signal data is outside the indicated range, the $C_B$ signal data is modified so as to have the value in the vicinity of the central value of the indicated range.

Figure 3:
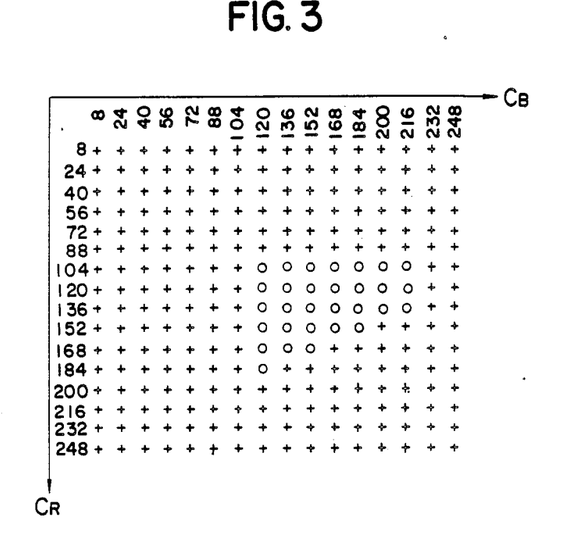
FIG. 3 is a schematic diagram used for explanation of an embodiment of the invention.

By way of example, when the Y signal data judged to be correct is at the quantization level of 56, the values that the $C_R$ and the $C_B$ signal data can have are defined to be within the region indicated by ○ in FIG. 3 according to the predetermined relationship. In case b of Table 1, since the $C_R$ signal data is judged to be correct, the range of the values that the $C_B$ signal data can have is restricted within narrower limits, namely, is restricted within the domain between quantization levels 120 and 216. Therefore, if the $C_B$ signal data is within this range, the $C_B$ data is output as it is, and if the $C_B$ signal data is outside the range represented by quantization levels 120 and 216, the $C_B$ signal data is modified so as to have the central value 168 of that range which is then output.

In the cases c and d of Table 1, the allowable range of the values that the data judged to be erroneous can take is again defined by the data that are judged to be correct, as in the above described case b and it is again judged whether or not to erroneous data is in this allowable range. The data judged to be erroneous is output as it is if it is within the allowable rane. On the other hand, if the erroneous data is outside the allowable range, the erroneous data is modified so as to have the value in the vicinity of the central value of the range of the values allowed for that data and then output.

In the case of Table 1, the Y signal is judged to be correct and the $C_R$ signal data and the $C_B$ signal data are judged to be erroneous. In this case, according to the relationship between Y, $C_R$, and $C_B$ signals and the R, G, and B signals are defined by the equations (2), it is determined that the values $C_R$ and $C_B$ to be taken by the $C_R$ signal data and the $C_B$ signal data must be within the range defined by $$-Y \leq C_R \leq 1-Y$$

$$-Y \leq C_B \leq 1-Y$$

$$-Y \leq -0.509C_R - 0.194C_B - 1 - Y.$$

It is judged whether or not the $C_R$ signal data and the $C_B$ signal data are within the indicated range. If the values of the $C_R$ signal data and the $C_B$ signal data are within that range, the $C_R$ signal data and the $C_B$ signal data are both output as they are.

If the values of either of the $C_R$ signal data or the $C_B$ signal data is present outside the range, the data outside the range is modified so as to take the value in the vicinity of the central value allowed of the values for that data and then output. If both the $C_R$ signal data and the $C_B$ signal data are out of the allowed ranges therefore, these data are modified so as to take the values adjacent to the central values of their respective ranges of allowed values and then output.

In the case where the Y signal data judged to be correct is at the representative quantization level of 56, for example, the values that the $C_R$ signal data and the $C_B$ signal data can take are defined within the region indicated by ○ in FIG. 3. If the $C_R$ signal data and the $C_B$ signal data judged to be erroneous are both present within the region indicated by ○, these data are output as they are without being modified.

In the case where some data is outside the region indicated by ○, for example, when the $C_R$ signal data is at the representative quantization level of 120 and the $C_B$ signal data is at the representative quantization level of 56, the $C_R$ signal data is judged to be correct since this $C_R$ signal data is within the range of values that the same can take. For this $C_R$ signal data, the values that the $C_B$ signal data can take are restricted within narrower limits, that is, within the range between quantization levels of 120 and 216, and the $C_B$ signal data is thus modified so as to take the value adjacent to the central value of that range, namely, 168. In the case where the $C_R$ signal data is at the quantization level of 40, and the $C_B$ signal data is at the quantization level of 232, both the $C_R$ signal data and the $C_B$ signal data are out of the ranges of the values they can take, and so, they are modified to take the values approximately adjacent to the central values of the regions indicated by ○, for example, values of, $C_R = 136$ and $C_B = 152$.

When the combination of the error flags applied to the ROM 7 is as shown in the case f or g of Table 1, the region of the numbers that the data judged to be erroneous can take is defined by the data judged to be correct in the same way as described above for the case e, and the data are output as they are if the error data are in such region, and if the error data are outside the region, the error data are modified so that they may take the values adjacent to the central values of the ranges of the values that the respective error data can take.

In case h of Table 1, all the data are detected to be erroneous and therefore judged to be uncorrectable. In such case, all the data are output as they are.

By way of summary, it will be seen that in the error modification circuit according to the present invention, the range of the values tat can be allowed for the residual uncorrectable error data shown to be erroneous by the respective error flag is defined according to the data that is shown to be correct by the respective error flag in accordance with the predetermined relationship between the R, G, and B signals and the Y, $C_R$, and $C_B$ signals, it is detected whether or not the erroneous data is within the allowable range, and if the error data is outside the range, the error data is modified so as to take a value adjacent to the central value of the allowable range of values for that data. Thus, when the modified reproduced signals Y, $C_R$, and $C_B$ are converted into R, G, and B signals, the latter will never exceed the amplitude values they had at the time they were input, and therefore the quality of the reproduced picture can be improved.

What is claimed is:

1. A method of effecting error modification of component video signal data comprising the steps of:
   receiving Y, $C_R$ and $C_B$ component video signal data sampled in positions in close vicinity to each other and provided with error flags for each of said component video signal data,
   detecting wheter data representing one video component and indicated to be erroneous by the respective error flag is in a specific range defined on the basis of data representing other video components and indicated to be correct by the respective error flag; and
   modifying said data indicated to be erroneous by said respective flag when the same is detected to be outside said specific range, so that the modified data comes within said specific range.

2. A method of modifying errors in data representing video components having predetermined normal relationships to each other, comprising the steps of:
   determining specific ranges of values for the data representing each of said video components on the basis of said normal relationships to the other of said video components;
   indicating erroneous data representing a respective video component;

detecting which of the data representing a respective video component and indicated to be erroneous is outside the specific range of values determined for said respective video component; and modifying the detected erroneous data by replacing the latter with predetermined data from within said specified range therefor.

3. A method for modifying errors in data representing video components having predetermined normal relationships to each other, comprising the steps of:

determining specific ranges of values for the data representing each of said video components on the basis of said normal relationships to the other of said video components;

associating an error flag with the data representing each of said video components for indicating that the video component data is erroneous;

selecting one of said ranges of values in accordance with said error flag indicating that the associated data is erroneous;

detecting which of the data indicated to be erroneous is outside the selected range of values of the respective video component; and modifying the detected erroneous data by replacing the latter with predetermined data from within said selected range of values for the respective video component.

4. The method according to claim 3; in which said data representing video components are of digital form, and said detecting is effected with reference to the upper significant bits of said erroneous data.

5. Apparatus for modifying errors in data representing video signal components having predetermined normal relationships to each other, comprising:

means for defining specific ranges of values for the data representing each of said video components on the basis of said normal relationships to the other of said video components;

means for indicating erroneous data representing a respective video component;

means for detecting which of the data representing a respective video component and indicated to be erroneous is outside said specific range of values for said respective video component; and means for modifying said erroneous data selected to be outside said specific range of values therefor by replacing such erroneous data with predetermined data from within the respective specific range.

6. Apparatus according to claim 5; in which said means for detecting includes memory means comparing said data representing said video components with the respective specific ranges therefor.

7. Apparatus according to claim 6; in which only upper significant bits of said data representing each of said video components is applied to said memory means.

8. Apparatus according to claim 7; in which said memory means generates data representing substantially central values in said specific ranges, and said erroneous data detected to be outside the respective specific range is replaced by the data representing said central value in said respective specific range.

9. Apparatus according to claim 8; in which said memory means includes read only memory which stores data in said specific ranges according to said normal relationships.

10. Apparatus according to claim 9; in which said data representing each of said video components has error flags associated therewith for indicating that the respective data is erroneous and said means for detecting includes means for applying said error flags to said read only memory and thereby identifying the data to be compared with said specific ranges in the memory means.

* * * * *